United States Patent
Kuriyama

(10) Patent No.: US 9,426,369 B2
(45) Date of Patent: Aug. 23, 2016

(54) IMAGING DEVICE

(71) Applicant: NIKON CORPORATION, Tokyo (JP)

(72) Inventor: Takashi Kuriyama, Yokohama (JP)

(73) Assignee: NIKO CORPORATION, Tokyo (JP)

( * ) Notice: Subject to any disclaimer, the term of this patent is extended or adjusted under 35 U.S.C. 154(b) by 0 days.

(21) Appl. No.: 13/684,951

(22) Filed: Nov. 26, 2012

(65) Prior Publication Data

US 2013/0141602 A1  Jun. 6, 2013

(30) Foreign Application Priority Data

Dec. 5, 2011 (JP) ................... 2011-265440
Jul. 2, 2012 (JP) ................... 2012-148560

(51) Int. Cl.
*H04N 5/232* (2006.01)

(52) U.S. Cl.
CPC ....... *H04N 5/23248* (2013.01); *H04N 5/23232* (2013.01); *H04N 5/23254* (2013.01)

(58) Field of Classification Search
CPC .......... H04N 5/23232; H04N 5/23254; H04N 5/23248
USPC .............. 348/208.99, 208.1, 208.4, 208.6, 348/208.12, 220.1, 239
See application file for complete search history.

(56) References Cited

U.S. PATENT DOCUMENTS

| | | | | |
|---|---|---|---|---|
| 8,395,670 | B2 * | 3/2013 | Noguchi | 348/208.11 |
| 8,525,894 | B2 * | 9/2013 | Kunishige et al. | 348/220.1 |
| 2009/0079842 | A1 * | 3/2009 | Wilson | 348/222.1 |
| 2009/0091635 | A1 * | 4/2009 | Fukuyama | 348/220.1 |
| 2010/0073402 | A1 * | 3/2010 | Delia et al. | 345/625 |
| 2011/0043651 | A1 | 2/2011 | Nonaka et al. | |
| 2013/0258128 | A1 | 10/2013 | Nonaka et al. | |

FOREIGN PATENT DOCUMENTS

| | | |
|---|---|---|
| JP | A-10-042233 | 2/1998 |
| JP | A-2007-151008 | 6/2007 |
| JP | A-2008-85688 | 4/2008 |
| JP | A-2011-044936 | 3/2011 |

OTHER PUBLICATIONS

Dec. 3, 2013 Japanese Office Action issued in Japanese Application No. 2012-148560 (with translation).

* cited by examiner

*Primary Examiner* — Daniel M Pasiewicz
(74) *Attorney, Agent, or Firm* — Oliff PLC

(57) ABSTRACT

This imaging device comprises: a storage unit that sequentially stores a plurality of frame images based on an imaging signal from an imaging sensor for capturing images of a subject light and also stores a still image corresponding to any of the plurality of frame images; a movie image generation unit that generates slow-motion movie images to be played back at a second frame rate lower than a first frame rate indicative of the number of frame images stored in the storage unit in a unit of time, on the basis of the plurality of frame images stored in the storage unit; and an image stabilization amount calculation unit that uses, as a reference, the frame image corresponding to the still image from among the plurality of frame images, to calculate an image stabilization amount for the slow-motion movie images.

9 Claims, 5 Drawing Sheets

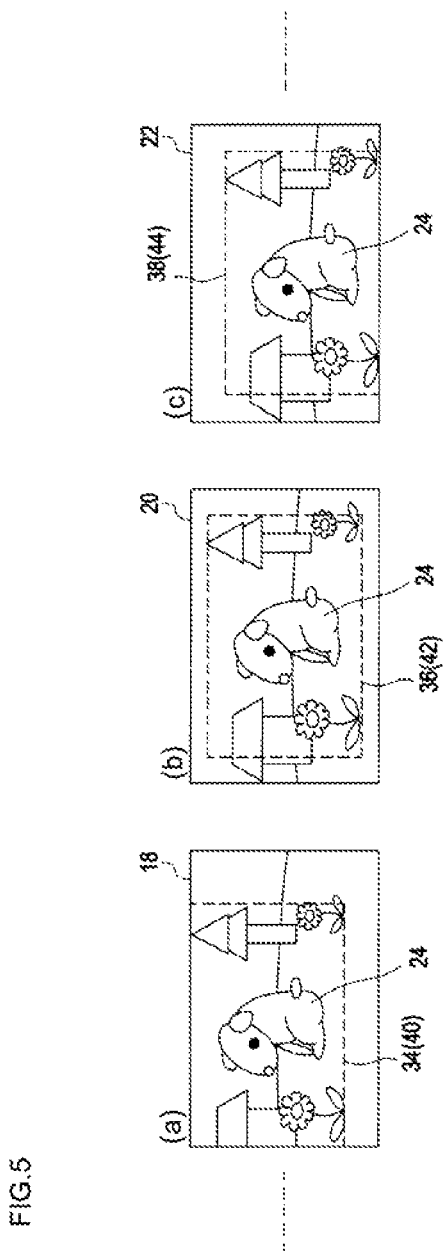

IMAGING DEVICE

CROSS-REFERENCE TO RELATED APPLICATIONS

The disclosure of the following priority applications is herein incorporated by reference:

Japanese Patent Application No. 2011-265440, filed on Dec. 5, 2011; and

Japanese Patent Application No. 2012-148560, filed on Jul. 2, 2012.

TECHNICAL FIELD

The present invention relates to an imaging device capable of recording movie images.

BACKGROUND ART

There is known an imaging device for performing image stabilization on movie images in a case Where a camera shake has been detected while movie images are being captured (for example, see Patent Document 1). In the imaging device of such description, when a camera shake is detected in a case where movie images are being captured at a normal frame rate, the frame rate is set to be higher and image stabilization is performed.

CITATION LIST

Patent Literature (Patent Document 1) Japanese Unexamined Patent Application Publication No. 2008-85638

SUMMARY OF INVENTION

Technical Problem

In the imaging device recited in Patent Document 1, no disclosure is made of a technique for using a timing intended by a photographer as a reference to perform image stabilization on the preceding and following movie images.

An object of the present invention is to provide an image device whereby a timing intended by a photographer can be used as a reference to record information relating to image stabilization with respect to the preceding and following movie images.

Solution to Problem

An imaging device according to the present invention comprises: a storage unit that sequentially stores a plurality of frame images based on an imaging signal from an imaging sensor for capturing images of a subject light and also stores a still image corresponding to any of the plurality of frame images; a movie image generation unit that generates slow-motion movie images to be played back at a second frame rate lower than a first frame rate indicative of the number of frame images stored in the storage unit in a unit of time, on the basis of the plurality of frame images stored in the storage unit; and an image stabilization amount calculation unit that uses, as a reference, the frame image corresponding to the still image from strong the plurality of frame images, to calculate an image stabilization amount for the slow-motion movie images.

Advantageous Effects of Invention

According to the imaging device of the present invention, it is possible to use a timing intended by a photographer as a reference to record information relating to image stabilization with respect to the preceding and following movie images.

BRIEF DESCRIPTION OF DRAWINGS

FIG. 5 is a drawing illustrating a recording region arid a playback region in a frame image acquired by an electronic camera according to an embodiment.

DESCRIPTION OF EMBODIMENTS

Figure 1:
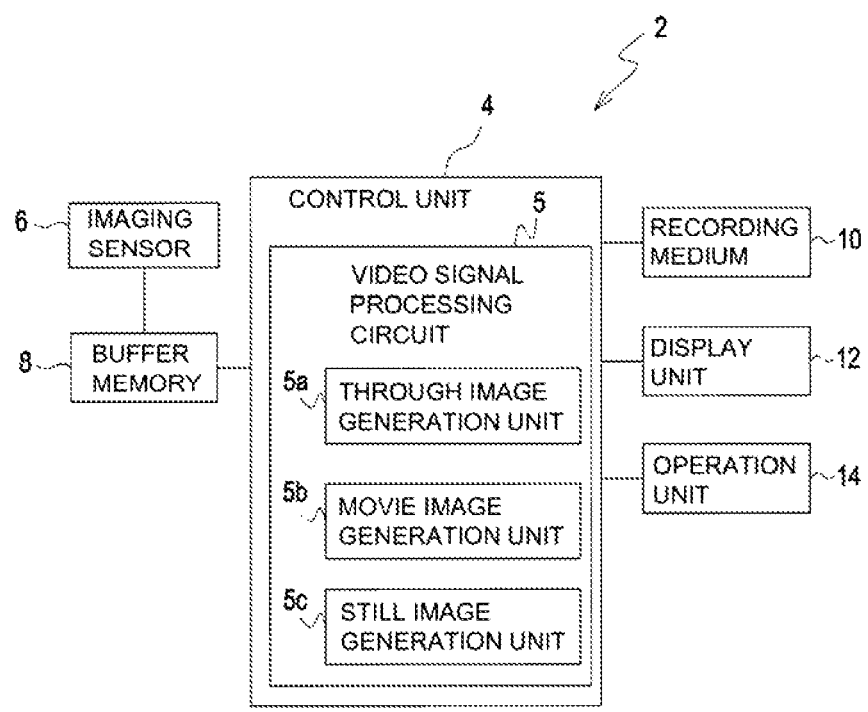
FIG. 1 is a block diagram illustrating a system configuration of an electronic camera according to an embodiment.

Provided below is a description of an electronic camera serving as an imaging device according to a first embodiment of the present invention. FIG. 1 is a block diagram illustrating a system configuration of the electronic camera according to the first entailment. As illustrated in FIG. 1, an electronic camera 2 is provided with a control unit 4 for overall control of each of the parts of the electronic camera 2, the control unit 4 being constituted of a microprocessor or the like. The control unit 4 has a video signal processing circuit 5; the video signal processing circuit 5 has a through-image generation unit 5a that generates through-image data to be displayed on a display unit 12 (described below), a movie image generation unit 5b that generates movie image data, and a generated image generation unit 5c that generates still image data. Connected to the control unit 4 are a buffer memory 8, a recording medium 10, the display unit 12, and an operation unit 14.

The buffer memory 8 temporarily stores image data created on the basis of an imaging signal from an imaging sensor 6. Herein, the imaging sensor 6 is constituted of a CCD, a CMOS, or the like, and captures images of light from a subject via an imaging lens (not shown); the buffer memory 8 temporarily stores image data based on an imaging signal outputted from the imaging sensor 6 and converted from an analog signal to a digital signal by passing through an A/D converter (not shown).

In a case where the electronic camera 2 has been set, for example, to a slow-motion movie image capturing mode for capturing slow-motion movie images (described below; hereinafter called "slow movie images"), then the buffer memory 8 sequentially stores a plurality of sets of image data based on the imaging signal outputted synchronously with a movie image cycle (60 fps or the like) from the imaging sensor 6, i.e., stores a plurality of frame images constituting slow movie images. In the present embodiment, the buffer memory 8 sequentially stores frame images having the number of pixels specified by QFHD (Quad Full High Definition: 3840×2160 pixels), i.e., high-resolution frame images, in a FIFO (first in first out) scheme.

More specifically, in a case where the buffer memory 8 has a storage region capable of storing, for example, n frame images (n being a natural number), the control unit 4 causes the buffer memory 8 to sequentially store a first acquired frame image $F_1$, a second acquired frame image $F_2$, . . . and an n-th acquired frame image $F_n$, as illustrated in FIG. 2(a). After the n frame images $F_1$ to $F_n$ have been stored, whenever the subsequent frame image $F_{n+1}$ is outputted from the imaging sensor 6, the oldest frame image $F_1$ is deleted from the buffer memory 8 and the newest frame image $F_{n+1}$ is stored; the process for deleting the oldest frame image and storing the newest frame image is repeated every time the subsequent frame image is outputted from the imaging sensor 6.

In other words, the buffer memory 8 has n storage regions (storage regions for sequentially storing the frame images), and sequentially stores the first frame image $F_1$ in a storage region having an address number (n–1), the second frame image $F_2$ in a storage region having an address number (n–2), . . . and an n-th frame image $F_n$ in a storage region having an address number 0. When the frame images $F_1$ to $F_n$ have been stored in all of the n storage regions and the subsequent frame image $F_{n+1}$ is outputted from the imaging sensor 6, the frame image $F_1$ of the storage region having the address number (n–1) (i.e., the oldest trains image) is deleted and each of the frame images $F_2$ to $F_n$ is moved from the storage regions having the address numbers (n–2) to 0, to the storage regions having the address numbers (n–1) to 1; the (n+1)-th frame image $F_{n+1}$ (i.e., the newest frame image) is stored in the storage region having the address number (0). Accordingly, the newest frame image is always stored in the storage region having the address number (0), increasingly older frame images are stored in increasingly higher address numbers, and the newest frame image is always stored in the storage region having the address number 0.

The recording medium 10 is a portable recording medium detachably mounted into a card slot (not shown) provided to the electronic camera 2; for example, a CF card, an SD card, or smart, media is used. The recording medium 10 records movie image data and slow-motion movie image data created by the movie image generation unit 5b within the control unit 4, which subjects each of the frame images stored in the buffer memory 8 to a process for resizing to a resolution for movie images (from a high to low resolution), an image process for movie images, and a compression process for movie images. The recording medium 10 also stores still images data created by the still image generation unit 5c within the control unit 4, which subjects the frame images stored in the buffer memory 8 to an image process for still images and a compression process for still images; the recording medium further stores information relating to image-capturing, and the like.

The display unit 12 is constituted of a monitor or EVF or the like constituted of an LCD or the like disposed on a back surface part of the electronic camera 2, and displays through-images generated by the through-image generation unit 5a, movie images based, on the movie image data recorded in the recording medium 10, slow movie images based on the slow-motion movie image data (hereinafter called "slow movie image data"), still images based on the still image data, information relating to image-capturing, and the like.

The operation unit 14 is configured to comprise: a power source switching for turning on or off a power source of the electronic camera 2; a command dial for setting an imaging mode, such as a movie image capturing mode for capturing movie images or a slow-motion movie image capturing mode for capturing slow movie images; a release button for issuing an instruction such as to begin capturing movie images or still images; a menu button for causing the display unit 12 to display a menu or the like; a cross key to be operated when menu items or the like are selected or when a variety of settings are being made; an OK button for confirming the selection of a menu item or a variety of different settings; a playback button for causing the display unit 12 to display the movie image data or the still image data recorded in the recording medium 10; and the like.

In the electronic camera 2 according to the present entailment, slow movie image data, output from the imaging sensor 6, to be played back at a second frame rate lower than a first frame rate indicative of the number of frame images stored in the buffer memory 8 in a unit of time are generated, and image stabilization is also performed; also, still image data based on at least one frame image of the plurality of frame images forming the slow movie image data is generated, and the image-stabilized slow movie image data and still image data are recorded in the recording medium 10 in association with each other.

Provided below is a description of a process for when slow movie images and still images are captured in the electronic camera 2 according to the present embodiment.

In the present embodiment, slow movie image data is generated on the basis of the plurality of frame images stored in the buffer memory 8 from when a still image capturing command is inputted until prior to a first predetermined duration, as well as on the basis of the plurality of frame images stored in the buffer memory 8 from after the frame images serving as the still image data were stored in the buffer memory 8 until after a second predetermined duration. In other words, slow movie image data is generated on the basis of the plurality of frame images stored in the buffer memory 8 during a predetermined duration (the first predetermined duration plus the second predetermined duration), and still image data is generated on the basis of the frame image(s) stored in the buffer memory 8 upon the termination of the first predetermined duration (upon the initiation of the second predetermined duration). The predetermined duration (for example, 1 second), the first predetermined duration (for example, 0.6 seconds), and the second predetermined duration (for example, 0.4 seconds) are set in advance, stored in a memory or the like (not shown), and configured so as to he changeable.

Figure 3:
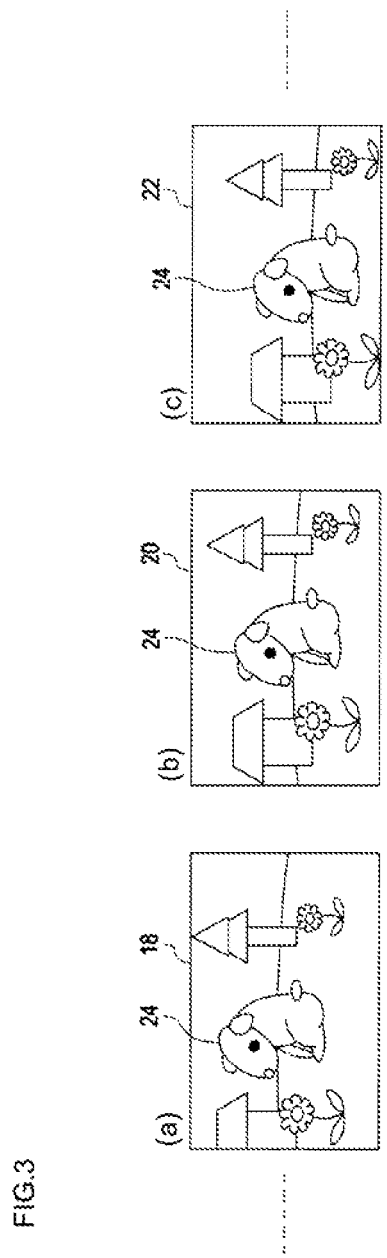
FIG. 3 is a drawing illustrating a fraise images acquired by an electronic camera according to an embodiment.

When the user operates the command dial to thereby set the slow-motion movie image capturing mode, the control unit 4 moves to the slow-motion movie image capturing mode for capturing the slow-motion movie images and the still images. Next, in a case where the control unit 4 has ascertained that the user has pressed the release button down halfway, the control unit 4 determines that a command to generate slow movie image data has been issued, and drives a focus lens or the like (not shown) so as to focus on a primary subject 24 within the through-images illustrated in FIG. 3 (frame images 18, 20, and 22). The control unit 4, upon ascertaining that the focus is on the primary subject, initiates capturing of slow-motion movie images, i.e., buffering thereof into the buffer memory 8.

More specifically, as described above, the plurality of frame images $F_1$ . . . $F_n$ . . . (see FIG. 2) based on the imaging signal outputted synchronously with the movie image cycle from the imaging sensor 6 begin to be stored in predetermined addresses within the buffer memory 8.

Next, in a case where the first predetermined duration has elapsed and it is ascertained that the user has pressed the release button entirely down while the storage of the frame images into the buffer memory 8 is being repeated, then the control unit 4 determines that a still image capturing command for commanding that still image data be generated has been inputted, and initiates the second predetermined duration (terminates the first predetermined duration).

Figure 2:
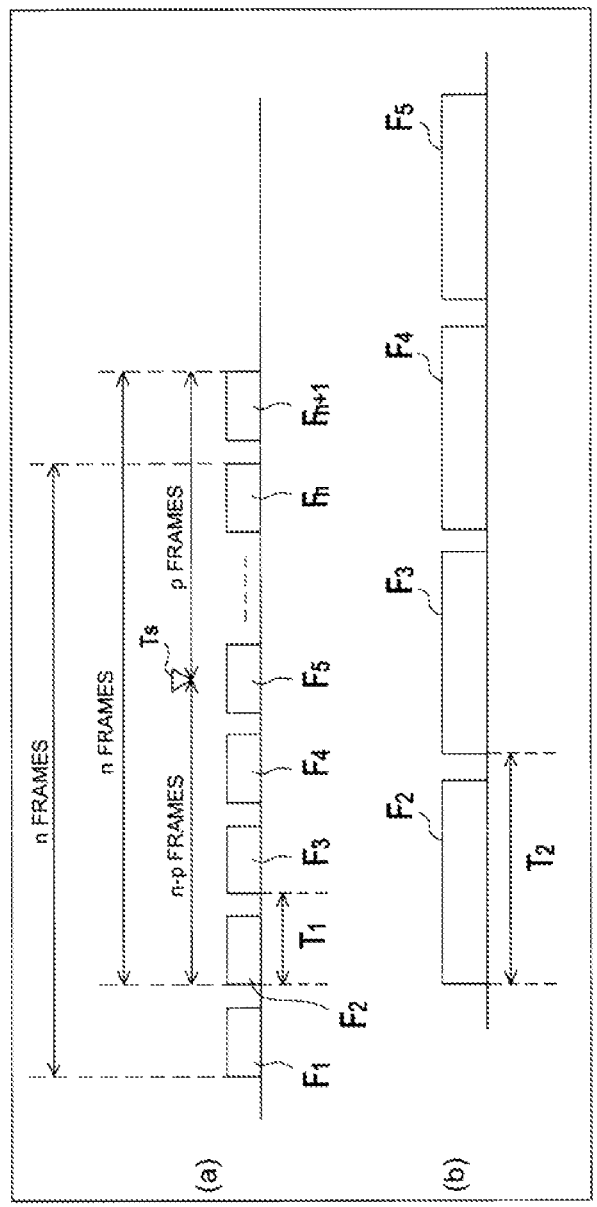
FIG. 2 is a drawing for describing a frame rate during buffer memory storage and a frame rate during recording medium recording when slow-motion movie images are captured, in an electronic camera according to an embodiment.

Next, when it is ascertained that the second predetermined duration has elapsed, the control unit 4 determines that the storage of the n frame images needed to generate the slow movie image data into the buffer memory 8 has been terminated, and terminates the buffering into the buffer memory 8. At such a time, as illustrated in FIG. 2 (a), the buffer memory 8 has stored (n−p) frame images $F_2$ to $F_5$ ... (where p is a natural number and n>p), from immediately prior to an input time TS of the still image capturing command until prior to the first predetermined duration, as well as p frame images ... $F_n$, $F_{n+1}$ from the input time TS of the still image capturing command until after the second predetermined duration; the slow movie image data is generated on the basis of the n frame images $F_2$ to $F_{n+1}$.

Next, the control unit 4 determines a movement vector of the subject. Herein, in a case where the frame image 20 illustrated in FIG. 3(b) is acquired at the input time TS of the still image capturing command, the frame image 18 illustrated in FIG. 3(a) being a frame image which is one prior to the input time TS of the still image capturing command and the frame image 22 illustrated in FIG. 3(c) being a frame image which is one after the input time TS of the still image capturing command, then the control unit 4 performs an image process to thereby determine the movement vector, which is indicative of the direction and travel of the angle of view generated by a camera shake.

Figure 4:
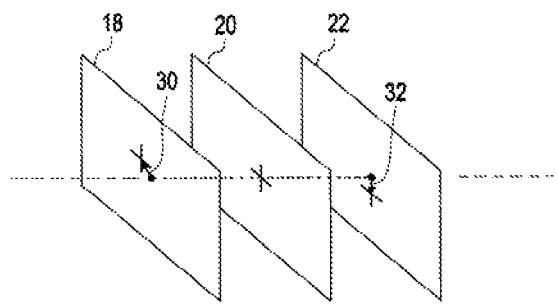
FIG. 4 is a drawing illustrating a movement vector in a frame image acquired by an electronic camera according to an embodiment.

For example, when a "+" position of the frame image 20 in FIG. 4 serves as a hypothetical reference position for image stabilization, then the movement vector is determined as illustrated by the arrows 30 and 32 in the frame images 18 and 22, respectively. The arrows 30 arid 32 schematically illustrate the magnitude and direction of movement of a specific subject within the frame image, where the frame image at the input time TS of the still image capturing command serves as a reference. The "•" in the frame images 18 and 22 illustrates a hypothetical reference position within the screen of the frame image 20.

As such, performing similar image process for each of the n frame images makes it possible to determine the movement vector representative of the fluctuation caused by a camera shake, where the timing TS intended by the user serves as a reference for each of the frame images.

Next, the control unit 4 cuts out a recording reference region 36 recorded as slow move image data within the frame image 20 acquired at the input time TS of the still image capturing command illustrated in FIG. 5(b), on the basis of the magnitude and direction of the movement vector determined for each of the frame images. In the frame image 18 illustrated in FIG. 5(a), which is one prior to the frame image 20, and in the frame image 22 illustrated in FIG. 5(c), which is one after the frame image 20, recording regions 34 and 38 in which the recording reference region 36 illustrated in FIG. 5(b) has been moved by a predetermined amount based on the magnitude of the movement vector in the direction of the movement vector are cut out on the basis of the movement vector illustrated by the arrows 30 and 32 in FIG. 4, and the recording regions are temporarily stored in the buffer memory 8. A recording region of the same size as the recording reference region 36, having been determined in FIG. 5(b) on the basis of the movement vector, is also cut out in the other frame images in a similar manner, and the recording region is temporarily stored in the buffer memory 8.

The control unit 4 determines the size of the recording reference region 36 on the basis of the magnitude and direction of the movement vector. For example, the size of the recording reference region 36 is determined per the maximum amplitude of the movement vector in all the frame images stored in the buffer memory 8.

Next, the control unit 4 executes a process for generating slow movie image data and a process for generating still image data, on the basis of the plurality of frame images stored in the buffer memory 8 as well as the recording regions cut out from the frame images.

Firstly, the process for generating the slow movie image data shall be described. The control unit 4 reads out, from the buffer memory 8, the recording region cut out from a frame image at the second frame rate lower than the first frame rate (for example, 24 frames per second, which is 1/2.5 of the first frame rate). In other words, as illustrated in FIG. 2(a), the recording region for the frame image $F_2$ stored in the buffer memory 8 at a time $T_1$ (for example, ⅟60th of a second) is read out from the buffer memory 8 at a time $T_2$ (for example, ½4th of a second), as illustrated in FIG. 2(b). The movie image generation unit 5b within the video signal processing circuit 5 executes a resolution resizing process (resizing to a lower resolution for the number of pixels in full HD or the like) for movie images as well as an image process for movie images (including a compression process for movie images) on the recording regions of the read-out frame images $F_2$ to $F_5$ ..., to thereby generate slow movie image data. The value of the second frame rate is set in advance, stored in a memory or the like (not shown), and configured so as to be changeable.

Next, the process for generating still image data shall be described. The control unit 4 reads out, from the buffer memory 8, the frame image stored in the buffer memory 8 at the input time TS of the still image capturing command. The still image generation unit 5c within the video signal processing circuit 5 executes an image process for still images (including a compression process for still images) on the read-out frame images to generate still image data. In the present embodiment, because frame images having, for example, a number of pixels specified in QFHD, i.e., high-resolution frame images, are stored in the buffer memory 8, it is possible to obtain high-resolution still image data. With respect to the still image data that is generated (recorded in the recording medium 10), the frame images having the number of pixels specified in QFHD may be recorded, or images made by cutting out (trimming) at the aforedescribed cut-out region (the region matched to the recording region) may be used. In terms of the still image data to be recorded, the user may also be allowed to change the settings as appropriate for the side of the image data to be recorded (full-sized or trimmed).

The control unit 4 records, into the recording medium 10, the slow movie image data generated by the movie image generation unit 5b. The still image data generated by the still image generation unit 5c is also recorded into the recording medium 10. Further, information indicative of the fact that the slow movie image data and the still image data are related to each other (an image-capturing date and time, or an identification number) is recorded into the recording medium 10. When playback is to be performed, the control unit 4 causes the display unit 12 to display slow movie images based on the slow movie image data, and thereafter causes the display unit 12 to display still images based on the still image data associated with the slow movie image data.

According to the electronic camera according to the present embodiment, it is possible to use a timing intended by a photographer, as a reference to record slow movie image data in which image stabilization has been performed on preceding and following movie images. It is also possible to play back slow movie images on which image stabilization has been performed, on the basis of the recorded slow movie image data.

As such, when the slow movie images based on the slow movie image data are played back on the display unit 12 or a PC, television, digital photo frame, or other external device, it is possible to suppress a camera shake and to view stable, more impressive slow movie images.

Next, an electronic camera according to a second embodiment of the present invention shall now be described. The electronic camera according to the second embodiment has the same configuration as the configuration of the electronic camera 2 according to the first embodiment, and therefore a description thereof has been omitted, and like elements of the configuration have been given like reference numerals in the description.

In the electronic camera 2 according to the second embodiment, each of the frame images constituting the slow movie image data is recorded into the recording medium 10, each of the frame images is cut out on the basis of the movement vector during playback of the slow movie images, and the slow movie images are played back. Provided below is a description of a process for when the slow movie image data is recorded in the electronic camera 2 according to the second embodiment.

Similarly with respect to the first embodiment, in the slow-motion movie image capturing mode, when an input in which the user has pressed the release button down halfway is received, the control unit 4 performs a focusing operation and thereafter begins buffering the frame images in the buffer memory 8, and When an input in which the release button has been pressed entirely down is received, the control unit 4 buffers the frame images until the second predetermined duration elapses. Next, similarly with respect to the first embodiment, a movement vector for each of the frame images, using the frame image at the input time TS of the still image capturing command as a reference, is determined.

Next, the control unit 4 executes a process to generate the slow movie image data and a process to generate the still image data, on the basis of the plurality of frame images stored in the buffer memory 8.

Firstly, the process for generating the slow movie image data shall be described. The frame images $F_2$ to $F_5$ . . . stored in the buffer memory 8 at a first frame rate (for example, 60 frames/second) similar to the frame rate outputted from the imaging sensor 6 (the imaging frame rate) are read out by the control, unit 4 from the buffer memory 8 at a second frame rate (for example, 24 frames/second, which is 1/2.5 the first frame rate) lower than the first frame rate. More specifically, as illustrated in FIG. 2(a), a frame image $F_2$ stored in the buffer memory 8 at a time $T_1$ (for example, 1/60th of a second) is read out from the buffer memory 8 at a time $T_2$ (for example, 1/24 seconds), as illustrated in FIG. 2(b). The movie image generation unit 5b within the video signal processing circuit 5 executes an image process for movie images (including a compression process for movie images) on the read-out frame images $F_2$ to $F_5$ . . . , to thereby generate the slow movie image data. The value of the second frame rate is set in advance, stored in a memory or the lire (not shown), and configured so as to be changeable.

The movie image generation unit 5b may also perform a resolution resizing process for movie images on the frame images $F_2$ to $F_5$ . . . prior to performing the image process for movie images. However, in a case where the resizing process is performed prior to the image process for movie images, the image stabilization process will be performed by the afore-described image process after the resizing thereof, and therefore it becomes necessary to perform a resizing process having an adequate margin to allow for the image stabilization to be achieved (resizing process endowing the movie image side with a margin as wide as the camera shake).

Further, the process to generate the still image data is similar to that of the first entailment, and therefore a description thereof has been omitted.

Next, the slow movie image data generated, by the movie image generation unit 5b is recorded into the recording medium 10. The movement vector (see FIG. 4) determined as above is also recorded in association with each of the frame images constituting the slow movie image data.

The still image data generated by the still image generation unit 5c is also recorded into the recording medium 10. Further, information indicative of the fact that the slow movie image data and the still image data are related to each other (an image-capturing date and time, or an identification number) is recorded into the recording median 10.

Next, the process in a case where the slow movie image data recorded in the recording medium 10 is to be played back shall now be described. When the user operates the playback button to issue a command to play back the slow movie image data, the control unit 4 causes the display unit 12 to display a screen for making a selection as to whether or not to perform image stabilization on the slow movie images being played back.

Herein, in a case where the user has issued a playback command in which image stabilization is not to be performed, then the control unit 4 reads out and plays back the slow-motion movie image data from the recording medium 10.

On the other hand, in a case where the user has issued a playback command in which image stabilization is to be performed, the control unit 4 reads out the slow-motion movie image data from the recording medium 10, and thereafter cuts out and plays back a playback region from each of the frame images. Herein, the playback region in each of the frame images is determined using as a reference a playback reference region 42 in the frame image 20 acquired at the input time TS of the still image capturing command. Herein, the playback reference region 42 is, for example, a predetermined region including the primary subject 24 within the frame image 20 illustrated in FIG. 5(b).

The size of the playback reference region 42 is pre-set on the basis of the magnitude and direction of the movement vector determined using as a reference the frame image acquired at the input time TS of the still image capturing command. For example, the size of the playback reference region 42 is determined such that a specific subject is located at the center in the frame image where the magnitude of the movement vector is greatest.

The control unit 4 sequentially reads out the frame images constituting the slow-motion movie image data for every predetermined timing, cuts out the playback region from, the read-out frame images, and causes the display unit 12 to sequentially display the same.

Herein, the playback region in each of the frame images is a region of the same size as the playback reference region 42, where a position of the playback reference region 42 illustrated in FIG. 5(b) has been moved by a predetermined amount based on the magnitude of the movement vector, in the direction of the movement vector. For example, in the frame image 18, illustrated in FIG. 5(a), which is one prior to the frame image 20, and in the frame image 22, illustrated in FIG. 5(c), which is one after the frame image 20, playback regions 40 and 44 of the same size as the playback reference region 42 are cut out, where Ike playback reference region 42 illustrated in FIG. 5 (b) has been moved by a predetermined amount in the movement vector direction on the basis of the movement vector illustrated by the arrows 30 and 32 in FIG. 4.

After the playback of the slow movie images, the control unit 4 causes the display unit 12 to display still images based on the still image data associated with the slow movie image data.

In the playback of the slow movie image data, the configuration is such that the display unit 12 displays and plays back the slow movie images, but a configuration may also be adopted in which the slow movie images are outputted to a PC, television, digital photo-frame, or similar external device and are displayed on the external device.

According to the electronic camera of the present embodiment, it is possible to use a timing intended by a photographer as a reference for recording information relating to image stabilization for the preceding and following movie images. If is also possible to select, during the playback of slow movie images, whether or not to perform image stabilization and then play back the slow movie images.

In each of the embodiments described above, the configuration is such that the frame image acquired at the input time TS of the still image capturing command is recorded in the recording medium 10 as the still image data, but a configuration may also be adopted in which a single frame image is chosen by a "best shot selection" from the frame images acquired at the first predetermined duration and the second predetermined duration, which are before and after the TS, and the chosen frame image is recorded in the recording medium 10 as the still image data. Herein, in the best shot selection, for example, each of the frame images is assessed on the basis of the degree of camera shake, the degree of smiling, and the like, and the frame image having the highest assessment value(s) is selected as the still image data to be recorded in the recording medium 10.

In each of the embodiments described above, the configuration is such that a frame image having a number of pixels specified by QFHD (3,840×2,160 pixels) is stored in the buffer memory 8, but a configuration may also be adopted in which a frame image having a number of pixels specified by full HD (full high definition: 1,920×1,080 pixels) or a similar frame image having a number of pixels at least as high as what is specified by full HD is stored in the buffer memory 8. In such a case, only the still image data may be stored in the buffer memory 8 as per the QFBD specifications on the basis of the still image capturing command.

In each of the embodiments described above, the configuration is such that the movement vector is found by performing an image process, but a configuration may also be adopted in which the movement vector is found on the basis of the output from an acceleration sensor or similar camera shake detection sensor.

In each of the embodiments described above, the configuration is such that the frame image at the input time TS of the still image capturing command is used as a reference to find the movement vector for each of the frame images, but a configuration may also be adopted in which a frame image preceding or following by one frame is used as a reference to find the movement vector. For example, for each of the frame images earlier than the frame image at the input time TS of the still image capturing command, the frame image one after the respective frame image may be used as a reference to find the movement vector, and for each of the frame images after the frame image at the input time TS of the still image capturing command, the frame image one prior to the respective frame image may be used as a reference to find the movement vector. In this manner, each of the frame images of the movie images may serve as the aforedescribed reference image for each of the frame images continuing prior to (or after) the respective frame image.

Beyond this even, a frame image other than the one in the aforedescribed embodiments (any single frame image other than the frame image at the input time TS of the still image capturing command) may be used as the reference image. For example, a single frame image selected by applying the aforedescribed best shot selection technique may also serve as the reference image. In such a case, as described by the above-mentioned best shot selection, the range in which the test shot selection is performed may include those frame images acquired at the first predetermined duration and the second predetermined duration, which are the durations before and after the input time TS of the still image capturing command, or may include all frame images stored in the buffer memory 8. Alternatively, the user may foe allowed to select a single desired frame image to serve as the reference image, from among the plurality of frame images stored in the buffer memory 8. In such a case, candidate frame images which the user is able to select as desired may be all images within the buffer memory 8, or may be limited to the plurality of frame images close in terms of image-capturing time to the input time TS (images within several frames before and after the frame image at the input time TS).

The above-described embodiments have been recited in order to facilitate understanding of the present invention, and are not recited in order to limit the present invention. Accordingly, in effect, each element disclosed in the above-described embodiments also includes all design changes and equivalents failing within the technical scope of the present invention.

The invention claimed is:

1. An imaging device, comprising:
   a storage unit that sequentially stores a plurality of frame images based on an imaging signal from an imaging sensor that captures images of a subject light and also stores a still image corresponding to any of the plurality of frame images;
   a movie image generation unit that generates slow-motion movie images to be played back at a second frame rate lower than a first frame rate indicative of the number of frame images stored in the storage unit in a unit of time, on the basis of the plurality of frame images stored in the storage unit;
   an image stabilization amount calculation unit that uses, as a reference, the frame image corresponding to the still image from among the plurality of frame images, to calculate an image stabilization amount for the slow-motion movie images; and
   a still image generation unit that generates still image data by processing any frame image, as the reference, of the plurality of frame images corresponding to the still image based on the calculated stabilization amount.

2. The imaging device according to claim 1, comprising:
   an image processing unit that performs image stabilization on the slow-motion movie images, on the basis of the image stabilization amount, and
   a recording control unit that records, in a recording medium, the slow-motion movie images on which the image processing unit has performed the image stabilization.

3. The imaging device according to claim 1, comprising a recording control unit that records, in a recording medium, the image stabilization amount in association with the slow-motion movie images, wherein:
   the slow-motion movie images, when read out from the recording medium, are played back with the image stabilization being performed by the image processing unit on the basis of the image stabilization amount.

4. The imaging device according to claim 1, comprising a posture detection unit that detects the posture of the imaging device, wherein:

the image stabilization amount calculation unit uses the detection result from the posture detection unit in order to calculate the image stabilization amount.

5. The imaging device according to claim 1, comprising a command unit that commands an image-capturing timing for the still image, wherein:

the still image is captured on the basis of the command from the command unit.

6. A display device, comprising:

a storage unit that sequentially stores a plurality of frame images based on an imaging signal from an imaging sensor that captures images of a subject light and also stores a still image corresponding to a frame image of the plurality of frame images;

a movie image generation unit that generates slow-motion movie images to be played back at a second frame rate lower than a first frame rate indicative of the number of frame images stored in the storage unit in a unit of time, on the basis of the plurality of frame images stored in the storage unit;

an image stabilization amount calculation unit that uses, as a reference, the frame image corresponding to the still image from among the plurality of frame images, to calculate an image stabilization amount for the plurality of frame images; and a control unit that cuts out a reference region within the still image based on the calculated stabilization amount, wherein the reference region is used to cut out a corresponding reference region of each of the other frames of the plurality of frames in generating movie image data to be played back.

7. A display device, comprising:

a storage unit that sequentially stores a plurality of frame images based on an imaging signal from an imaging sensor that captures images of a subject light and also stores a still image corresponding to a frame image of the plurality of frame images;

a movie image generation unit that is electrically connected to the storage unit and that generates movie images on the basis of the plurality of frame images stored in the storage unit; and a control unit that is electrically connected to the storage unit and that cuts out a reference region within the still image based on information regarding an image stabilization amount, wherein the reference region is used as a reference to cut out a corresponding reference region of each of the other frames of the plurality of frames in generating the movie images.

8. An imaging device, comprising:
the display device of claim 6.

9. An imaging device, comprising:
the display device of claim 7.

* * * * *